May 1, 1934.　　　　D. K. DEAN　　　　1,957,251
GAS PURIFICATION AND THE LIKE
Filed Nov. 1, 1928
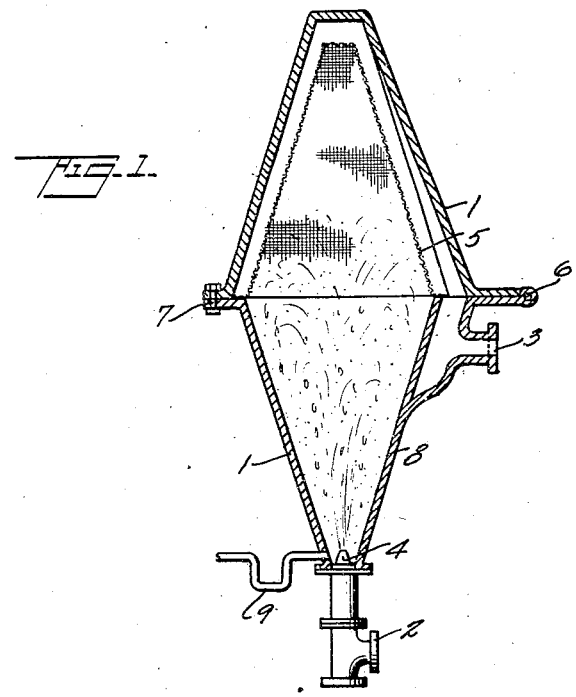
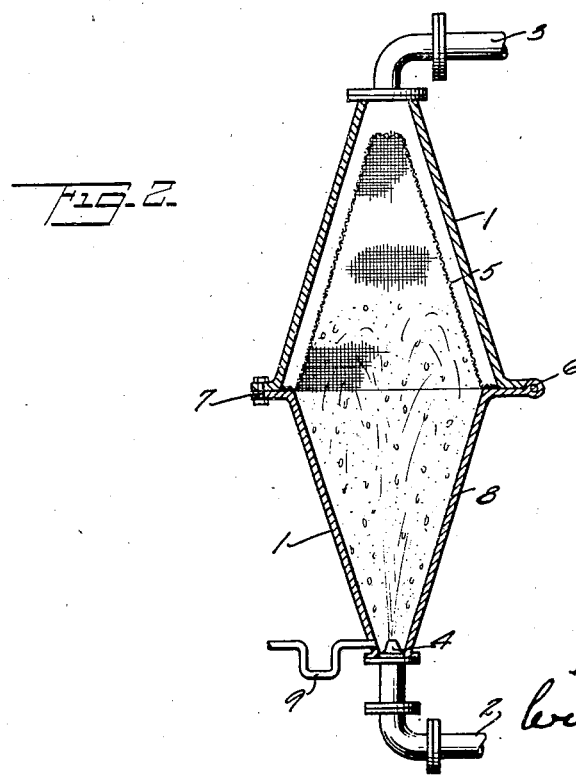
INVENTOR
Dion K. Dean
BY
ATTORNEY Patented May 1, 1934

1,957,251

UNITED STATES PATENT OFFICE 1,957,251

GAS PURIFICATION AND THE LIKE

Dion K. Dean, Rahway, N. J., assignor to Foster Wheeler Corporation, New York, N. Y., a corporation of New York Application November 1, 1928, Serial No. 316,500

11 Claims. (Cl. 183—4)

My invention relates primarily to purification of gases or vapors. It also relates to treatment of solids by gases.

In the application of the invention to treatment of gases or vapors I have for a principal purpose to provide a highly efficient method and apparatus for removing from gases or vapors substances held in suspension, floating in the gas or vapor, or otherwise forming a part of the gas stream.

One application of my invention is the purification of petroleum vapors in processes of distillation and oil cracking. To purify the vapor, I propose to inject it into a quantity of finely comminuted solid matter, thereby dispersing the solid matter as a dust into a stream of the vapor, expand the vapor to thoroughly commingle the vapor and comminuted material while forming a permeable wall or screen of the comminuted material and passing the vapor through the permeable wall or screen to separate the comminuted material and entrained or absorbed impurities from the vapor. My novel process is preferably so carried out that the vapor disperses the comminuted material to a great degree of fineness and carries it in suspension in a highly diffused state in the stream of vapor.

The nature of the gas or vapor to be treated or the nature of the impurities to be separated out are determinative of the nature of the treating material and the character of action whereby the impurities are separated out or other action inhibited, that is whether it be an adsorptive, chemical, physical or catalytic action or a combination of two or more of these.

Two preferred forms of apparatus for carrying out the invention are illustrated in the accompanying drawing whereon:

Fig. 1 shows, in section, one form of apparatus for carrying out my novel process; and Fig. 2 shows another form.

Referring to Fig. 1, casing or hopper 1 is made of two main parts, a lower cone-shaped section of increasing cross-sectional area from the bottom upwards and an upper cone-shaped section of increasing cross-sectional area from the top downwards. The casing is arranged on a vertical axis. At the bottom or lower cone axis is a supply connection 2 to which a gas or vapor or mixture of gases or vapors, hereinafter termed gas, is supplied. At the upper part of the inlet connection is a nozzle or injector 4 which may be of various forms. Its purpose is to give velocity to the gas. The nozzle may be such as to throw a single stream of gas directly upwards or a single stream of gas at an angle or a plurality of streams dispersed at different angles.

In the upper cone-shaped section is a cone-shaped screen arranged substantially parallel to the casing wall. The screen is supported by being clamped between the two sections. The screen may obviously be otherwise supported, however. The sections are hinged together at 6 and are held together by one or more bolts 7 passing through suitable holes in matching flanges.

An outlet 3 is provided for purified or treated gas and drain 9 arranged to form a loop seal is connected with the bottom part of the casing to drain liquid therefrom. A quantity of finely comminuted solid material is contained in the casing. In purification of petroleum vapors this material may be "Filtrol" which is a special acid-treated clay having a high adsorptive capacity.

In operation the gas is supplied to connection 2 under sufficient pressure to give velocity to the gas leaving the nozzle 4. The jet of gas blows the comminuted material, which I will hereinafter refer to as "dust", upwardly, breaking it up and forming a sort of cloud or mist in the casing. In view of the increasing cross-section of the path of flow of the gas carrying the dust, the velocity and consequently the carrying capacity of the gas diminishes in the direction of flow. This causes an increasing amount of the dust to precipitate and fall back down as the gas rises. The particles of dust falling down come into the swifter moving fluid and are again picked up and carried upwardly. Thus there is a great agitation of the gas and dust. The spread of the wall of the lower section of the casing should be less than an amount such that the dust will collect thereon. That is, the angle of inclination of the wall from the horizontal should be greater than the angle of repose of the dust.

The dust adsorbs the impurities in the exemplary application given and I provide the screen 5 to definitely free the gas from the dust and the impurities adsorbed thereby. The screen is interposed in the path of gas travel between inlet 2 and outlet 3 and has two functions. First it serves to remove the dust from the gas. Second, it forms, together with dust deposited thereon, a skeleton of dust which is permeable to gas but highly impervious to solid matter and on which are deposited impurities not adsorbed in the action taking place in the lower casing section and so causes a secondary or final purification. Thus substantially none of the gas leaves the casing without treatment.

The inverted cone form of screen prevents the depositing of dust thereon to a prohibitive degree as the weight of dust adhering to the screen would become so great, should an excessive amount tend to deposit, that it would fall back into the lower part of the casing.

Outlet 3 is preferably provided, as shown, in the lower part of the casing with a suitable channel connecting it with the upper part of the casing outside screen 5 so that the upper casing section may be swung up for cleaning and for renewing the dust without breaking pipe connections.

Fig. 2 shows an arrangement essentially similar to that of Fig. 1 but differing in that outlet 3 is connected to the extreme top of the casing.

Several of the casings or hoppers may be connected in series or parallel or both. By connecting a plurality in parallel, continuous operation may be obtained as one or more can be shut down and cleaned while one or more others are in operation. Depending on the use, it may be advisable to heat the casing by a steam jacket or the like or to insulate it.

Instead of using solid material to treat gas, the apparatus may serve to treat a batch of solid material by contact with gas. The contact action may be strictly physical as when the dust serves to provide nuclei for the precipitation of condensable substances. The action may be strictly catalytic in that the dust might not enter into the precipitation action but inhibit such action.

It will be understood that my invention is not limited to the specific apparatus illustrated and described or to the applications described.

What I claim is:

1. The method for uses described which comprises continually injecting gas into a mass of comminuted material to disperse the comminuted material, forming a permeable wall of the comminuted material, passing the gas through said wall and returning the excess comminuted material from said wall to said mass.

2. The method of purifying gas and the like which comprises continually injecting gas into a quantity of comminuted material to disperse the comminuted material, passing the gas through a screen having comminuted material deposited thereon due to the aforesaid dispersion and bringing the excess comminuted material from the screen into contact with gas prior to its passage through the screen.

3. The process of purifying gas and the like which comprises injecting the gas into a quantity of comminuted material and dispersing the comminuted material, decreasing the velocity of the gas and returning dispersed material to faster moving gas, forming a wall of comminuted material which is permeable to gas but highly impervious to solid matter and passing the gas through said wall.

4. In apparatus for purifying gas and the like, a casing adapted to hold a mass of comminuted material and having a gas inlet and a gas outlet, said inlet being disposed so as to discharge the gas into the mass of comminuted material, means associated with said inlet to increase the velocity of gas supplied thereto and means forming a permeable wall of comminuted material interposed in the path of travel of gas from the inlet to the outlet; said wall being disposed so as to return the excess comminuted material from the wall to the mass thereof in said casing.

5. In apparatus of the class described, a vertical casing adapted to hold comminuted material having an inlet at the bottom and an increasing cross-section upwardly from the inlet, means associated with the inlet to increase the velocity of gas supplied thereto and means forming a permeable wall of comminuted material interposed in the path of travel of gas from the inlet to the outlet.

6. The method for the uses described which comprises injecting vapor into a mass of comminuted absorbent material and introducing into the path of the absorbent laden vapor a material which permits the vapor to pass while obstructing the passage of the absorbent material and allowing the absorbent material to return to the mass.

7. In apparatus for purifying gas, a casing adapted to hold comminuted material having a gas inlet and a gas outlet, means associated with said inlet for increasing the velocity of gas supplied thereto to disperse the comminuted material, and means for forming a permeable wall of comminuted material interposed in the path of travel of gas from the inlet to the outlet, said casing being formed so as to reduce the velocity of the gas to precipitate comminuted material at a point remote from the inlet and said casing being formed so as to return the precipitated material to the vicinity of said inlet.

8. In apparatus of the class described, a vertical casing adapted to hold comminuted material, the lower part of said casing comprising a cone-shaped wall with the apex of the cone at the bottom, an inlet nozzle at said apex, and a cone-shaped screen with the apex of the cone at the top positioned in the upper part of said casing, the angle of inclination of said cone-shaped wall being greater than the angle of repose of the comminuted material so that comminuted material deposited on said wall will gravitate to the nozzle at said apex.

9. In apparatus of the class described, a vertical casing adapted to hold comminuted material, the lower part of said casing comprising a cone-shaped wall with the apex of the cone at the bottom, an inlet nozzle at said apex, the upper part of said casing comprising a cone-shaped wall with the apex at the top, and a cone-shaped screen concentric with the wall forming the upper part of said casing and spaced therefrom, the angle of inclination of said cone-shaped wall forming the lower part of said casing being greater than the angle of repose of the comminuted material so that comminuted material deposited on said wall will gravitate to the nozzle at said apex.

10. In apparatus for purifying gas and the like, a casing adapted to hold comminuted material having a gas inlet and a gas outlet, a nozzle at the inlet to the casing to increase the velocity of the gas supplied thereto, said nozzle being disposed so as to discharge the gas into the comminuted material, and a screen in the casing interposed in the path of travel of the gas between the inlet and the outlet to remove the dust and impurities from the gas, said casing being formed to return the comminuted material removed by the gas to the vicinity of the nozzle.

11. In apparatus of the class described, a vertical casing composed of oppositely disposed conical sections with apices remote and adapted to hold comminuted material, an inlet nozzle in the bottom of the casing adapted to increase the velocity of the fluid supplied thereto, the nozzle being disposed so as to discharge fluid into the comminuted material, a screen for removing the dust and impurities from the gas and disposed in the upper part of the casing and an outlet arranged to receive fluid entering the nozzle and passing through the screen.

DION K. DEAN.